United States Patent Office 3,391,990
Patented July 9, 1968

3,391,990
HIGH PURITY SODIUM TRIPOLYPHOSPHATE
Chung Yu Shen, St. Louis, Mo., assignor to Mitsubishi Petrochemical Company Limited, Tokyo, Japan
No Drawing. Filed Apr. 19, 1965, Ser. No. 449,289
16 Claims. (Cl. 23—107)

ABSTRACT OF THE DISCLOSURE

A process for purifying a relatively impure material which contains sodium tripolyphosphate and an inorganic heavy metal salt impurity selected from the group consisting of inorganic iron salts, inorganic aluminum salts, inorganic iron and aluminum complex salts and mixtures thereof comprising (a) initially contacting the relatively impure material with an aqueous liquid solvent containing less than the amount of water theoretically require to dissolve all of the sodium tripolyphosphate present in the relatively impure material but at least about 1 mol of water per mol of sodium tripolyphosphate in the relatively impure material in excess of the amount of water required to hydrate any anhydrous sodium tripolyphosphate present in the relatively impure material and (b) separating the resulting purified sodium tripolyphosphate from the aqueous liquid containing dissolved therein at least part of the inorganic heavy metal salt impurity.

---

This invention relates to the manufacture of sodium tripolyphosphates. More particularly it relates to the production of a high purity sodium tripolyphosphate from an impure sodium tripolyphosphate containing heavy metal impurities.

The manufacture of phosphoric acid from phosphate ore by the wet process acid route is well known. The phosphoric acid produced by the wet process route generally contains heavy metal impurities, such as iron and aluminum, and inorganic salt impurities such as sodium sulfate, fluorosilicates and sodium phosphates other than sodium tripolyphosphate. The heavy metal impurities are generally present in relatively large amounts. For example, iron impurities are usually present in amounts ranging from about 0.4% to about 1.2% by weight and aluminum impurities are usually present in amounts ranging from about 0.3% to about 1.0% by weight in typical "wet process" phosphoric acids containing about 30% $P_2O_5$. Sodium tripolyphosphate produced from such relatively impure phosphoric acids manufactured by this process has a lower purity than is desired by a large segment of the detergent industry; in particular the United States detergent industry. To enable production of sodium tripolyphosphate from wet process acid to meet the specifications of the detergent industry desiring high purity, the acid has been heretofore purified by a number of processes. One common purification process employs partial neutralization methods to remove part of the iron, aluminum, and fluorine but only a minor part of the sulfate. Sodium tripolyphosphates produced from the purified intermediates resulting from this process usually are not pure enough for many applications requiring high purity, such as a salt for meat pickling and generally contain inorganic iron and aluminum salt impurities such as the iron phosphates, iron polyphosphates, aluminum phosphates, aluminum polyphosphates, iron and aluminum mixed cation phosphates and polyphosphates and the like. Other processes which may be used generally include extraction of the impurities by relatively expensive oxygen-containing organic or basic type organic solvents such as alcohols, ethers, or amines. The impure sodium tripolyphosphate (manufactured from impure "wet" process phosphoric acid) can also be purified by several known processes which normally involve several recrystallization steps and employ organic solvents such as ethanol, propanol and the like to suppress solubility and to cause crystallization of sodium tripolyphosphate.

It is believed that an economical process for producing a high purity sodium tripolyphosphate from an impure sodium tripolyphosphate, such as is produced from an impure "wet process" phosphoric acid (which process does not involve an expensive solvent or a crystallization step) would be a significant advancement in the art. Note, however, that the processes of the present invention are not limited to those involving the purification of sodium tripolyphosphate from "wet process" acid; rather it is applicable for treatment of any sodium tripolyphosphate containing any level of such iron and/or aluminum impurities.

It is therefore an object of this invention to provide a process whereby a relatively high purity sodium tripolyphosphate can be produced from a relatively impure sodium tripolyphosphate.

It is another object of this invention to provide a process for separating the before-mentioned impurities from sodium tripolyphosphate compositions containing them as impurities.

It is a further object of this invention to provide a process for producing a high purity sodium tripolyphosphate from an impure sodium tripolyphosphate produced from wet process phosphoric acid that contained relatively high levels of iron and aluminum impurities.

It is still another object of this invention to provide a process for removing relatively large amounts of inorganic iron and/or aluminum salts and simultaneously removing other water soluble inorganic salts from an impure sodium tripolyphosphate containing the heavy metal and inorganic salt impurities.

Another object of this invention is to provide an economical process for preparing high purity sodium tripolyphosphate which process does not have many of the handicaps of processes previously used for the production of high purity sodium tripolyphosphates from relatively impure phosphoric acid and/or sodium tripolyphosphate.

Other objects of this invention will become readily apparent to one skilled in the art from the detailed description following.

It has been discovered that high purity sodium tripolyphosphate can be produced from an impure sodium tripolyphosphate by a unique process comprising initially contacting the impure sodium tripolyphosphate with an aqueous solvent and thereafter separating the aqueous solvent from the treated sodium tripolyphosphate in order to remove impurities from the impure sodium tripolyphosphate. The processes of this invention comprise an extraction operation whereby (a) an aqueous solvent is used to effect a separation of impurities from an impure sodium tripolyphosphate containing said impurities and (b) a separation step whereby the purified sodium tripolyphosphate is separated from the aqueous liquid containing dissolved therein the impurities removed from the impure sodium tripolyphosphate.

The aqueous solvent useful in the practice of this invention is a solvent containing less than the amount of water theoretically required to dissolve all of the impure sodium tripolyhphosphate to be purified, but which contains at least 1 mol of water per mol of sodium tripolyphosphate in excess of the amount of water required to hydrate to the hexahydrate form the anhydrous sodium tripolyphosphate present in the impure sodium tripolyphosphate and which less than the saturation amount of the impurities, is is desired to remove from the impure sodium tripolyphosphate. While the aqueous solvent can contain only water in the before-mentioned amounts, it is preferred to incorporate other components, especially sodium tripolyphosphate, into the aqueous solvent in hereinafter-described amounts and to conduct the extraction under controlled conditions; all of which will be more fully described hereinafter.

This invention is useful in removing relatively large amounts of inorganic heavy metal salt selected from the group consisting of inorganic iron salts, inorganic aluminum salts, inorganic iron and aluminum complex salts and mixtures thereof from impure sodium tripolyphosphate containing said inorganic heavy metal salt impurities and simultaneously removing other inorganic salts, such as sodium sulfate when they are also present in the impure sodium tripolyphosphate. Therefore, this invention enables the purification of an impure sodium tripolyphosphate such as is produced from "wet" process phosphoric acid to thereby produce a high purity sodium tripolyphosphate suitable for use in the detergent or food industry.

The present invention employs an aqueous solvent to remove water insoluble impurities from a water soluble material. It is believed surprising that an aqueous solvent of any kind will remove impurities (especially iron and aluminum phosphates and polyphosphates since these impurities are normally considered to be water insoluble) from sodium tripolyphosphate which is a water soluble polyphosphate.

The impure sodium tripolyphosphates which can be purified by the subject invention are sodium tripolyphosphates which can be in either anhydrous hydrated or mixtures thereof which contain relatively high levels of the beforementioned inorganic heavy metal salts and which sometimes contain, in addition to these heavy metal salts, other water soluble inorganic salts such as sodium sulfate and other sodium phosphates. "Relatively high levels," as used herein, refer to levels generally found in sodium tripolyphosphate such as are produced from relatively impure phosphoric acid made via the so-called "wet" process route. For example, sodium tripolyphosphate from the "wet" process usually contains levels of iron ranging from about 30 p.p.m. to about 1,000 p.p.m. by weight and aluminum ranging from about 25 p.p.m. to about 800 p.p.m. by weight and can contain up to about 3.0% by weight (or even more) of sodium sulfate and can contain up to about 20% by weight of water soluble sodium phosphates other than tripolyphosphate. While the subject invention is particularly suited for purifying an impure sodium tripolyphosphate produced from "wet" process in the amounts previously given, the invention can be used to purify any sodium tripolyphosphate which contains (in addition to the inorganic heavy metal salt impurities mentioned hereinbefore) other inorganic metal salt impurities such as inorganic calcium, magnesium, vanadium salts and the like in amounts of up to 1.5% by weight.

As previously mentioned the first step of the present invention is extracting the impurities from impure sodium tripolyphosphate with an aqueous solvent. Although an aqueous solvent containing any amount of impurities less than the saturation amount of the impurities which are being removed from the impure sodium tripolyphosphate, it is preferred to use aqueous solvents which contain less than about 50% by weight of the saturation amount of the before-mentioned impurities with those aqueous solvents containing less than 10% by weight of the saturation amount being especially preferred. "Saturation amount" as used herein means the amount of before-mentioned impurities required to saturate the aqueous solvent at 25° C. It is preferred in the practice of this invention to use an aqueous solvent comprising water and dissolved therein an amount of sodium tripolyphosphate equal to from about 3% by weight to that amount required to saturate said aqueous solvent with sodium tripolyphosphate. In addition, a solvent which is supersaturated with sodium tripolyphosphate can be used with satisfactory results. For example, an aqueous solution which is supersaturated with sodium tripolyphosphate hexahydrate can be advantageously used in some instances to increase the rate of hydration of any anhydrous sodium tripolyphosphate that may be present in the impure material being treated. However, lesser amounts of sodium tripolyphosphate, that is amounts below about 3% by weight, can be present in the aqueous solution. Thus, an aqueous solvent consisting essentially of water can also be used to satisfactorily purify the before-mentioned impure sodium tripolyphosphates in accordance with the present invention. The use of an aqueous solvent containing less than about 3% of sodium tripolyphosphate or an aqueous solvent essentially free of sodium tripolyphosphate will generally result in a lower yield of purified sodium tripolyphosphate and will require more complicated steps to recover the phosphate value from the effluent in those instances where such recovery is undertaken. Hence, it is particularly preferred, in the practice of this invention, to utilize aqueous solvents that are approximately saturated with sodium tripolyphosphate, that is, those that contain from about 95% to 100% by weight of the sodium tripolyphosphate required to saturate the aqueous solution at 25° C. When the aqueous solvent used in the practice of this invention contains less than the amount of sodium tripolyphosphate required to saturate it, it is necessary to use less than the amount of solvent which will completely dissolve the sodium tripolyphosphate. When the aqueous solvent contains at least the saturation amount of sodium tripolyphosphate, essentially unlimited amounts of aqueous solvent can be used. However as a practical matter, it is generally preferred that the weight ratio of aqueous solvent to impure sodium tripolyphosphate that is utilized in the practice of this invention be from about 1:1 to about 2.5:1.

It was mentioned heretofore that in the practice of this invention, it is necessary to use a sufficient amount of solvent to provide at least about 1 mol of water per mol of sodium tripolyphosphate in excess of the amount of water required to hydrate any anhydrous sodium tripolyphosphate present. For example, when purifying anhydrous sodium tripolyphosphate, 6 mols of water per mol of sodium tripolyphosphate will be used to hydrate the sodium tripolyphosphate to sodium tripolyphosphate hexahydrate. In addition, by using conventional solid separation methods, a purified solid sodium tripolyphosphate will be separated which can contain free water generally in amounts of from about 3 to about 8% by weight. Therefore, to achieve the separation whereby the impurities will be contained in the liquid and the solid sodium tripolyphosphate will be purified, it is necessary to use a sufficient amount of solvent to provide at least about 1 mol of water per mol of sodium tripolyphosphate in excess of the amount of water that is required to hydrate the anhydrous sodium tripolyphosphate to sodium tripolyphosphate hexahydrate. Use of smaller amounts of water will result in unsatisfactory separation and therefore cannot be used. When purifying impure sodium tripolyphosphate hexahydrate, no water is required for hydration. Therefore, it is only necessary to use enough solvent to provide the before-mentioned 1 mol of excess water per mol of sodium tripolyphosphate hexahydrate. For preferred separation, it is preferred to use sufficient solvent to provide from about 5 to about 100 mols of water per mol of sodium tripolyphosphate in excess of the amount of water that is required to hydrate the sodium tripolyphosphate to sodium tripolyphosphate hexahydrate and the especially preferred range being from about 10 to about 30 mols of water per mol of sodium tripolyphosphate.

In the practice of this invention, it is desirable for the aqueous solvent to intimately contact the impure solid sodium tripolyphosphate for a sufficient time to thereby enable the removal of at least part of the heavy metal impurities from the impure sodium tripolyphosphate. "Intimate contact," as used herein, is physical contact wherein the aqueous solvent permeates the solid particles of sodium tripolyphosphate so as to remove at least some of the impurities from the solid tripolyphosphate. The amount of impurities that it is necessary to remove will vary depending upon the end use of the sodium tripolyphosphate. Thus the degree of contact and time of contact can also be varied to achieve the level of impurities desired by the particular person practicing the present invention.

The time of contact between the solvent and impure solid sodium tripolyphosphate required to achieve the desired purification will depend upon several variables such as the particle size of the impure solids, the purity of the solvent, the impurity content of the sodium tripolyphosphate, the temperature of the solvent and the extraction temperature, the agitation used and the desired purity for the particular end use. For example, the contact time required for the same solvent to remove the impurities from sodium tripolyphosphate with a relative small particle size will be less than for removing the same amount of impurities from similar sodium tripolyphosphate with relatively large particle size even if about the same amount of solvent is used and the same type of purification equipment is used. Since the surfaces of the particles of impure sodium tripolyphosphate will be contacted by the aqueous solvent nearly instantaneously upon the contact with the aqueous solvent, the time of contact can be from about 5 seconds or even shorter (when only a minor amount of impurities are desired to be removed) to about 5 hours or even longer, such as 24 hours (when a relatively high purity sodium tripolyphosphate is desired). In any event, the contact time should be sufficient for the desired amount of impurities to be removed from the impure sodium tripolyphosphate. A simple means of determining whether the contact time used has been sufficient is to sample the solids at different time intervals and analyze for iron. Analytical results of the iron content will indicate the residual impurity content and thus indicate if the contact time has been sufficient. A suitable analytical method for iron determination is that described on page 19, Catalogue No. 8, Water Analyses Procedures, Hach Chemical Company, Ames, Iowa. This method employs the color formation between iron and 1,10-phenanthroline or 2,4,6-tripyridyl-s-triazine. The color from iron and 2,4,6-tripyridyl-s-triazine is about twice as sensitive as 1,10-phenanthroline and is therefore recommended for the analysis of trace amounts of iron. In general, relatively longer contact times are required as (a) a higher purity product is produced, (b) as larger impure particles are used, (c) as lower purity solvents are used, (d) as lower purity impure solids are used and (e) as lower solvent and extraction temperatures are used.

Any conventional means of enabling the aqueous solvent to intimately contact the solids can be used. The particular method selected to cause the contact depends primarily upon the physical properties of the particles of the impure sodium tripolyphosphate to be purified. For example, when purifying finely divided particles of $-100$ mesh anhydrous sodium tripolyphosphate with an apparent density of about .5 gram per cc., a suitable means enabling the contact is to agitate the solid sodium tripolyphosphate and the aqueous solvent in a vessel equipped with a conventional agitator. For higher density solids that do not disintegrate into smaller particles (thereby causing a resistance to solvent flow), a suitable means of contact is to prepare a bed of the impure sodium tripolyphosphate in a tank with a false bottom and allow the aqueous solvent to flow by gravity through the bed thus leaching the impurities from the impure sodium tripolyphosphate. The solvent can be recirculated from the area under the false bottom to the top of the bed to insure complete and intimate contact. Good purification results can also be achieved by using a perforated screw conveyer to convey the sodium tripolyphosphate through an agitated tank filled with the aqueous solvent. As the impure sodium tripolyphosphate traverses the tank filled with the solvent, the "pumping" action of the agitator gives suitable circulation of solvent through the conveyor, enabling the solvent to permeate the particles of sodium tripolyphosphate to remove the impurities.

Excellent continuous purification can be achieved with countercurrent leaching in a multideck classifier. This equipment consists of a single tank divided into compartments and a drainage deck. The various compartments are connected in such manner as to allow the solvent, which enters at the solids discharge end, to flow continuously through the series of compartments leaving at opposite ends of the tank. The solids, after entering at the point of solvent discharge, are advanced by a conveyer opposite to the flow of solvent thus resulting in a countercurrent leaching purification process. An inclined trough which encloses a revolving helix also provides a suitable method for continuous purification of impure sodium tripolyphosphate. The trough has a weir at the lower end over which the solvent containing the impurities flows leaving the solids in the conveyer. The solvent is fed into the trough at the solids discharge end and thereby leaches the impurities from the solids as it flows countercurrent to the movement of the solids. By placing two or more troughs in series so that the solids from the first conveyer discharge into the next conveyer and the solvent overflows from the last conveyer to the next conveyer, a multiple stage extraction unit is provided. Selection of a single or multiple stage unit will be dependent upon several physical properties of the impure sodium tripolyphosphate and aqueous solvent such as the particle size and density of solids, amount of impurities present in the impure sodium tripolyphosphate and the amount of impurities present in the aqueous solvent.

It should be noted that the examples of means of providing the "contact" between aqueous solvent and relatively impure sodium tripolyphosphate in the practice of this invention are given for the purpose of explaining the invention and are not intended in any manner to limit the invention.

The separation of the purified sodium tripolyphosphate from the aqueous solvent will be dependent upon the method used to provide extraction. However, the "separation" necessary for the successful practice of the present invention must involve removal of at least part of the aqueous solvent in the liquid form, as differentiated from removal of the water via an evaporation step, for example. Thus, a batch-type extraction unit, comprising an agitated tank into which the solids and solvent are charged batchwise, is a suitable means of extraction for finely divided, relatively light density, impure sodium tripolyphosphate. In the before-mentioned extraction unit, the solids will be dispersed throughout the solvent and any conventional means of separating undissolved solids from liquids can be used to separate the purified tripolyphosphate from the solvent containing the impurities. Suitable equipment (which can be used individually or in series) includes filters, centerifuges and liquid cyclone separators. Heavier density impure solids with relatively large particle size can be purified by preparing a bed and allowing the solvent to flow by gravity through the bed of sodium phosphate. The solvent discharged from the bed generally will be relatively free of undissolved solids. If finely divided particles of sodium tripolyphosphate are present (which can occur if lighter density of finely divided particles are present in the impure sodium tripolyphosphate) any conventional means of separating solids and liquids can be used to remove the purified undissolved solids from the solvent stream. For example, a conventional centrifuge will serve as a suitable means to separate the finely divided solid particles from the solvent. To remove the residual solvent from the wet solids, a conventional rotary air dryer can be used.

While the practice of this invention may be conducted with solvent and extraction temperatures as high as 100° C. or even higher, it is preferred to practice the invention at temperatures below about 70° C. because of the normal tendency of sodium tripolyphosphate to degrade to other phosphates with relatively high tempeartures at the pH levels which are normally present in the practice of this invention. It is especially preferred to conduct the process of this invention wih extraction and solvent temperatures in the range of from about 20° C. to about 70° C. because under these temperature conditions the time required to extract a relatively large amount of impurities is relatively short and the degradation of sodium tripolyphosphate is extremely low. Temperatures below about 20° C., that is down to about −10° C., can also be used, for example in those cases where relatively low extraction rates are not a disadvantage.

As previously mentioned, other water soluble sodium phosphate salts, such as sodium pyrophosphate, sodium orthophosphate and sodium trimetaphosphate, can also be present in sodium tripolyphosphate which is produced from "wet process" phosphoric acid. These other phosphate salts are generally present in amounts from about 1% to about 10% by weight of the impure sodium tripolyphate and can be present in amounts up to about 20% or even more. While the subject invention is especially useful in removing heavy metal impurities from impure sodium tripolyphosphate, it can also be used to simultaneously remove a large proportion of these other water soluble sodium phosphate salts from an impure sodium tripolyphosphate containing them. Since the aqueous solvent generally is nearly saturated with sodium tripolyphosphate but not with other sodium phosphate impurities, such other sodium phosphates can often be preferentially removed from the impure sodium tripolyphosphate.

Certain inorganic salts can be advantageously used in the present process by incorporating them into the special aqueous solvent so as to significantly lower the solubility of the sodium tripolyphosphate in the aqueous solvent. Since a relatively inexpensive inorganic salt such as sodium chloride can be utilized to reduce the sodium tripolyphosphate solubility in the aqueous solvent, this technique can be utilized in the process of this invention. For example, in a process where heavy metal impurities are removed from an impure sodium tripolyphosphate and phosphate values are not recovered from the solvent, use of about 5% by weight of sodium chloride in the solvent lowers the solubility of sodium tripolyphosphate by about 8% by weight, thus reducing the loss of the relatively expensive phosphate values into the solvent. In any event such before-mentioned salts can be effectively employed to reduce the amount of sodium tripolyphosphate required to saturate the aqueous solvent.

When purifying an impure sodium tripolyphosphate containing other sodium phosphates, use of an inorganic salt dissolved in the aqueous solvent is particularly advantageous. For example, at 25° C. an aqueous solvent containing 5% by weight of sodium chloride lowers the solubility of sodium tripolyphosphate to about 4% by weight whereas the aqueous solvent can dissolve about 5% by weight of sodium pyrophosphate, about 8% by weight sodium orthophosphate and about 18% sodium trimetaphosphate, thus enabling the preferential removal of these undesired phosphate impurities from the inpure sodium tripolyphosphate.

Other salts which can be effectively used in the before-mentioned manner include sodium sulfate and sodium nitrate. Sodium salts are preferred to eliminate the possibility of forming mixed cation salts. However other salt solutions can be used if the presence of mixed cation salts is not objectionable; therefore any inorganic water soluble salt which lowers the solubility of sodium tripolyphosphate in the aqueous solution more than its presence lowers the solubility of the other inorganic salts present in the impure sodium tripolyphosphate can be used with the water soluble inorganic sodium salts being preferred. In addition, sodium hydroxide can be effectively employed in an aqueous solvent to convert at least some of the sodium trimetaphosphate present to sodium tripolyphosphate. For example, an aqueous solvent containing the theoretical amount of hydroxide to convert sodium trimetaphosphate to sodium tripolyphosphate and at a temperature of 50° C. will enable the conversion of about 80% of sodium trimetaphosphate to sodium tripolyphosphate in about 10 minutes. It has also been found for the successful practice of this invention when iron is present it is necessary that the extraction operation be carried out below a pH of about 11.5. This pH control is necessary to prevent the precipitation of ferric hydroxide which would otherwise remain with the sodium tripolyphosphate. Therefore, it is preferred to conduct the process of this invention particularly when iron impurities are present with the pH of the aqueous solvent being from about 7.5 to about 11.5; and, to achieve the desirable results, pH values should generally be from about 6.5 to about 12.5.

The high purity sodium tripolyphosphate hexahydrate that can be produced by this invention is particularly well suited to the manufacture of conventional heavy duty detergents. These heavy duty detergents are normally comprised of a detersive surfactant, that is a surface active agent of the anionic, nonionic or amphoteric type, and a polyphosphate as a builder to increase the cleaning efficiency of the detersive surfactant. When sodium tripolyphosphate is incorporated as a builder, one of the two anhydrous forms of sodium tripolyphosphate is generally used. The most common method of mixing the detersive surfactant and the builder is by the crutching operation wherein the surfactant, builder, and other additives are mixed together prior to spray drying. The anhydrous sodium tripolyphosphate is converted to the hexahydrate form in the crutcher and the surfactant and other additives are combined together with the builder in this step to form a detergent composition in a slurry form which is then spray dried to form a solid detergent composition. One of the preferred embodiments of this invention produces a pure sodium tripolyphosphate in the hexahydrate form, the use of which enables a continuous crutching operation in place of the conventional batchwise crutching operation. A continuous crutching operation can be better integrated with the other steps of the detergent manufacturing.

When the starting sodium tripolyphosphate raw material is an anhydrous sodium tripolyphosphate and the aqueous solvent is practically saturated with sodium tripolyphosphate, an additional advantage (i.e. extremely finely divided sodium tripolyphosphate hexahydrate crystals) can be obtained. This, however, is the subject matter of my patent application, Serial No. 449,304, filed concurrently herewith.

Although certain of the products resulting from the practice of this invention are well suited for use in detergents such products can also be used in practically any other field which sodium tripolyphosphate can be used, such as in agricultural operation, in foods and beverages, in the cleaning of metals and alloys, water treatment, clays and oil-well muds and the like.

To illustrate the invention the following examples are presented. All parts and percentages are by weight unless otherwise indicated.

EXAMPLE I

Two inclined helical conveyers are used to provide a continuous two-stage extraction unit. Impure anhydrous sodium tripolyphosphate is charged to the first or lower conveyer at the rate of 170 parts per hour. The impure sodium tripolyphosphate contains about 2.2% sodium sulfate, 1,500 p.p.m. iron and 800 p.p.m. aluminum. Of the phosphorus present in the impure product, only about 92.5% is in the form of sodium tripolyphosphate. The remaining phosphorus is in the form of other sodium phosphates; 6.3% sodium pyrophosphate, 0.6% sodium orthophosphate and 0.6% sodium trimetaphosphate. Essentially 100% of the impure sodium tripolyphosphate passes through a U.S. Standard 60 mesh screen and about 40% is retained on a U.S. Standard 270 mesh screen.

An aqueous solvent, consisting essentially of water and 4% by weight of sodium tripolyphosphate is charged into the second stage of the continuous two-stage extraction unit at the rate of 400 parts per hour.

The solid impure sodium tripolyphosphate is fed into the bottom of the first stage and as it travels up the first conveyer, the solvent from the second stage contacts the material extracting about 95% of the iron impurities; however, the sodium tripolyphosphate leaving the first stage is relatively rich in the other phosphates. The partially purified sodium tripolyphosphate is discharged into the bottom of the second stage conveyer and contacts the solvent flowing down the conveyer. In the second stage further extraction of the other phosphates occur. The sodium tripolyphosphate discharges from the second stage at the rate of 120 parts per hour and contains 0.1% sodium sulfate, 55 p.p.m. iron and 46 p.p.m. aluminum. Of the phosphorus present in the purified product, 98.8% is in the form of sodium tripolyphosphate. The whiteness of the sodium tripolyphosphate is increased from 84.5% reflectance as measured using tri-stimulus blue as a standard to about 94.5% reflectance. The resulting sodium tripolyphosphate hexahydrate has excellent detergent building properties and is of particular value in a built liquid detergent using a nonaqueous solvent or a slurry type detergent.

EXAMPLE II

One thousand parts of impure sodium tripolyphosphate hexahydrate ($Na_5P_3O_{10} \cdot 6H_2O$) containing .010% iron, 2.0% sodium sulfate and .001% aluminum are charged into an agitated tank. Essentially 100% of the impure sodium tripolyphosphate passes through a U.S. Standard 80 mesh screen and essentially 85% is retained on a U.S. Standard 325 mesh screen. Of the phosphorus present in the impure sodium tripolyphosphate, 93% is in the form of sodium tripolyphosphate. The remaining phosphorus is in the following forms: 6.0% sodium pyrophosphate, 0.6% sodium orthophosphate and 0.4% sodium trimetaphosphate.

Sixteen hundred parts of an aqueous solvent containing about 5% sodium chloride and about 5% sodium tripolyphosphate and about 90% water are charged into the agitated tank containing the sodium tripolyphosphate. The aqueous solvent and the impure sodium tripolyphosphate are allowed to stir for three hours.

The resulting slurry is centrifuged by a conventional automatic batch centrifuge. The centrifuge cake is analyzed and found to contain about 5% free water. Of the phosphorus present in the cake about 96% is in the form of sodium tripolyphosphate. The iron content has been reduced to about 50 p.p.m. and the aluminum content is less than about 10 p.p.m. Less than 0.1% of sodium sulfate remains in the purified sodium tripolyphosphate.

EXAMPLE III

One thousand parts of impure anhydrous sodium tripolyphosphate containing about 0.015% iron and 0.02% aluminum and 2% sodium sulfate and of the phosphorus present only 93% is in the form of sodium tripolyphosphate. The remaining phosphorus is in the following forms: 5% sodium pyrophosphate, 1% sodium orthophosphate and 1% sodium trimetaphosphate. The impure sodium tripolyphosphate is typical of that which is produced from a "wet" process phosphoric acid having the following analyses: 0.8% iron, 0.7% aluminum, 0.90% sulfate and 30.0% $P_2O_5$ purified by the standard neutralization and filtration procedure, as given by W. H. Waggaman, Phosphoric Acid, Phosphates and Phosphate Fertilizers, page 233, Reinhold Publishing Co., New York (1952). The above 1,000 parts of anhydrous sodium tripolyphosphate are charged into an agitated tank containing 2,000 parts aqueous solvent solution which contains 5.3 parts of 50% sodium hydroxide and 2 parts of sodium chloride. The contents are agitated for one hour at 50° C. The resulting slurry is centrifuged as in Example I. The centrifuge cake analyzes as follows:

| | |
|---|---|
| Free water _____percent__ | 8 |
| Sodium sulfate _____do____ | 0.1 |
| Iron _____p.p.m__ | 50 |
| Aluminum _____p.p.m__ | 10 |

Assay (on a percent of phosphorus present basis):

| | Percent |
|---|---|
| Sodium tripolyphosphate _____ | 97.8 |
| Sodium pyrophosphate _____ | 1.8 |
| Sodium orthophosphate _____ | 0.3 |
| Sodium trimetaphosphate _____ | 0.1 |

The sodium tripolyphosphate hexahydrate produced is suitable for direct addition into a crutching operation to be used as a builder in a dry detergent.

EXAMPLE IV

An impure sodium tripolyphosphate hexahydrate analyzed as follows:

| | P.p.m. |
|---|---|
| Iron _____ | 1,000 |
| Aluminum _____ | 700 |
| Calcium _____ | 100 |
| Vanadium _____ | 50 |

Assay on a percent of phosphorus present basis:

| | Percent |
|---|---|
| Sodium tripolyphosphate _____ | 88 |
| Sodium pyrophosphate _____ | 8.5 |
| Sodium orthophosphate _____ | 2.3 |
| Sodium trimetaphosphate _____ | 1.2 |

Whiteness is measured as 84% reflectance using tristimulus blue as a standard.

One thousand parts of the above impure sodium tripolyphosphate hexahydrate are charged into an agitated tank containing 220 parts of an aqueous solvent consisting essentially of water. The contents are allowed to agitate for 30 minutes. The slurry is filtered using a conventional rotary vacuum filter. Nine hundred forty parts of solids are separated which analyze as follows:

| | | |
|---|---|---|
| Free water _____percent__ | | 5 |
| Iron _____p.p.m.__ | | 150 |
| Aluminum _____p.p.m.__ | | 20 |
| Calcium _____p.p.m.__ | | 15 |
| Vanadium _____p.p.m.__ | | 10 |

The assay (on a percent of phosphorus present) is as follows:

| | Percent |
|---|---|
| Sodium tripolyphosphate _____ | 96 |
| Sodium pyrophosphate _____ | 2.5 |
| Sodium orthophosphate _____ | 1.3 |
| Sodium trimetaphosphate _____ | .2 |

Using the same standard (tri-stimulus blue) whiteness measured 92% reflectance. The sodium tripolyphosphate produced is suitable for dry detergent manufacture.

EXAMPLE V

One thousand parts of impure anhydrous sodium tripolyphosphate with the following analyses:

| | |
|---|---|
| Iron _____percent__ | .02 |
| Aluminum _____p.p.m.__ | 150 |
| Sodium sulfate _____percent__ | 2 | assay (on a percent of phosphorus present basis)—

| | Percent |
|---|---|
| Sodium tripolyphosphate | 93 |
| Sodium trimetaphosphate | 5 |
| Sodium pyrophosphate | 1 |
| Sodium orthophosphate | 1 | are charged into an agitated vessel containing 2,000 parts of an aqueous solvent containing enough sodium hydroxide to theoretically convert the trimetaphosphate to tripolyphosphate and 1% sodium chloride. The contents are agitated for about 2 hours at a temperature of 40° C. The resulting slurry is centrifuged as in Example I. Analytical results of the centrifuge cake are as follows:

| | | |
|---|---|---|
| Free water | percent | 8 |
| Sodium sulfate | do | 0.1 |
| Iron | p.p.m. | 50 |
| Aluminum | p.p.m. | 10 |

Assay (on a percent of phosphorus present basis):

| | Percent |
|---|---|
| Sodium tripolyphosphate | 96.7 |
| Sodium trimetaphosphate | 0.2 |
| Sodium pyrophosphate | 1.4 |
| Sodium orthophosphate | 1.7 |

The finely divided crystals after subsequent vacuum drying are particularly useful in liquid detergent or slurry type detergents.

EXAMPLE VI

An impure sodium tripolyphosphate assayed (on a percent of phosphorus basis):

| | Percent |
|---|---|
| Sodium tripolyphosphate | 82.0 |
| Sodium pyrophosphate | 6.8 |
| Sodium orthophosphate | 5.1 |
| Sodium trimetaphosphate | 6.1 |

Of the sodium tripolyphosphate present, 10% is in the Form I form and 90% is in the Form II form.

Other impurities analyzed as follows:

| | | |
|---|---|---|
| Iron | p.p.m. | 1,000 |
| Aluminum | p.p.m. | 800 |
| Sodium sulfate | percent | 2 |

Four hundred parts per hour of the above sodium tripolyphosphate are conveyed through a trough countercurrent to a flow of 800 parts of an aqueous solvent which is partially saturated with sodium tripolyphosphate. The sodium tripolyphosphate charged has a particle size equivalent to 100% passing through a U.S. Standard 4 mesh screen and 100% being retained on a U.S. Standard 20 mesh screen.

The purified sodium tripolyphosphate contains 5% free water and is dried in a rotary air dryer. The product produced assays (on a percent of phosphorus present basis):

| | Percent |
|---|---|
| Sodium tripolyphosphate | 93 |
| Sodium pyrophosphate | 3 |
| Sodium orthophosphate | 2 |
| Sodium trimetaphosphate | 2 |

Other impurities were as follows:

| | | |
|---|---|---|
| Iron | p.p.m. | 52 |
| Aluminum | p.p.m. | 56 |
| Sodium sulfate | percent | 0.2 |

The solvent collected from the trough and the centrifuge is separated into two parts. About 60% of the solution with additional make-up water is recycled to the trough for reuse. The other part of the solution is returned to the reaction wherein sodium carbonate is reacted with fresh phosphoric acid to give the feed solution for preparation of crude tripolyphosphate.

What is claimed is:

1. A process for purifying relatively impure sodium tripolyphosphate material which contains an inorganic metal salt impurity selected from the group consisting of inorganic iron salts, inorganic aluminum salts, inorganic iron and aluminum complex salts and mixtures thereof comprising (a) initially contacting said relatively impure material with an aqueous liquid solvent containing less than the amount of water theoretically required to dissolve all of the sodium tripolyphosphate present in said relatively impure material but at least about 1 mol of water per mol of sodium tripolyphosphate in said relatively impure material in excess of the amount of water required to hydrate any anhydrous sodium tripolyphosphate present in said relatively impure material and (b) separating the resulting purified sodium tripolyphosphate from the aqueous liquid containing dissolved therein at least part of said inorganic metal salt impurity by removing at least part of the aqueous solvent in the liquid form.

2. The process of claim 1 wherein the aqueous solvent contains dissolved therein at least about 3% by weight of sodium tripolyphosphate.

3. The process of claim 1 wherein the aqueous solvent contains from about 95% to about 100% by weight of the amount of sodium tripolyphosphate required to saturate said aqueous solvent.

4. The process of claim 1 wherein the impure sodium tripolyphosphate material contains sodium phosphates selected from the group consisting of sodium othophosphate, sodium pyrophosphate, sodium trimetaphosphate and mixtures thereof.

5. The process of claim 1 wherein the pH of said aqueous solvent during said process is from about 7.5 to about 11.5

6. The process of claim 5 wherein said aqueous solvent contains at least about 1% by weight of sodium chloride dissolved therein.

7. A process for purifying relatively impure sodium tripolyphosphate material which contains an inorganic metal salt impurity selected from the group consisting of inorganic iron salts, inorganic aluminum salts, inorganic iron and aluminum complex salts and mixtures thereof comprising (a) initially contacting said relatively impure material with an aqueous liquid solution containing less than the amount of water required to dissolve all of the sodium tripolyphosphate present in said relatively impure material but at least about 5 mols of water per mol of sodium tripolyphosphate in excess of the amount of water required to hydrate the anhydrous sodium tripolyphosphate present in said relatively impure material; (b) allowing said solvent to intimately contact said relatively impure material for at least about 5 seconds to thereby enable said aqueous solvent to permeate the particles of said impure material and to convert said anhydrous sodium tripolyphosphate to the hexahydrate form and (c) separating the resulting purified sodium tripolyphosphate hexahydrate from the aqueous liquid containing at least part of said inorganic metal salt impurity by removing at least part of the aqueous solvent in the liquid form; the pH of said aqueous solvent during said process being from about 7.5 to about 11.5.

8. The process of claim 7 wherein said impure sodium tripolyphosphate material contains sodium sulfate and at least one water soluble sodium phosphate selected from the group consisting of sodium orthophosphate, sodium pyrophosphate, sodium trimetaphosphate and mixtures thereof.

9. The process of claim 8 wherein said aqueous solvent contains at least about 1% by weight of sodium chloride dissolved therein.

10. The process of claim 8 wherein said aqueous solvent contains from about 95% to about 100% by weight of the amount of sodium tripolyphosphate required to saturate said aqueous solvent.

11. A process for purifying relatively impure sodium tripolyphosphate material containing an inorganic metal salt impurity selected from the group consisting of inorganic iron salts, inorganic aluminum salts, inorganic iron and aluminum complex salts, and mixtures thereof comprising a multistage extraction process wherein (a) said relatively impure material is contacted in an initial stage with an aqueous liquid solvent to thereby produce a partially purified sodium tripolyphosphate from which at least some of said heavy metal impurity has been removed; said aqueous solvent containing at least about 10 mols of water per mol of sodium tripolyphosphate in excess of the amount of water required to hydrate any anhydrous sodium tripolyphosphate present in said relatively impure material and said aqueous solvent containing less than the amount of water theoretically required to dissolve said relatively impure material and (b) separating said partially purified sodium tripolyphosphate from the aqueous liquid by removing at least part of the aqueous solvent in the liquid form and (c) charging a subsequent stage with said partially purified sodium tripolyphosphate; the pH of said aqueous solvent during said process being from about 7.5 to about 11.5.

12. The process of claim 11 wherein said impure sodium tripolyphosphate material contains sodium phosphates selected from the group consisting of sodium orthophosphate, sodium pyrophosphate, sodium trimetaphosphate and mixtures thereof.

13. The process of claim 11 wherein said aqueous solvent contains from about 95% to about 100% by weight of the amount of sodium tripolyphosphate required to saturate said aqueous solvent.

14. A process for purifying relatively impure sodium tripolyphosphate material containing an inorganic metal salt impurity selected from the group consisting of inorganic iron salts, inorganic aluminum salts, inorganic iron and aluminum complex salts and mixtures thereof comprising (a) initially contacting said relatively impure material with an aqueous liquid solvent containing less than the amount of water required to dissolve all of the sodium tripolyphosphate present in said impure sodium tripolyphosphate material; the weight ratio of said aqueous solvent to said relatively impure material being between about 1:1 and about 2.5:1; (b) allowing said solvent to intimately contact said impure material for at least about 5 minutes to thereby enable said aqueous solvent to permeate the particles of said relatively impure material; and (c) separating the resulting purified sodium tripolyphosphate hexahydrate from the resulting aqueous liquid containing dissolved therein at least part of said inorganic salt impurities removed from said impure sodium tripolyphosphate material by removing at least part of the aqueous solvent in the liquid form; the pH of said aqueous solvent during said process being from about 7.5 to about 11.5.

15. The process of claim 14 wherein said process being conducted is between about 30° C. and about 70° C.

16. The process of claim 15 wherein said aqueous solvent contains from about 95% to about 100% by weight of the amount of sodium tripolyphosphate required to saturate said aqueous solvent.

References Cited
UNITED STATES PATENTS

| | | | |
|---|---|---|---|
| 2,396,918 | 3/1946 | Hubbard et al. | 23—106 |
| 3,046,092 | 7/1962 | Montague | 23—106 |
| 3,054,656 | 9/1962 | Cassidy et al. | 23—106 |
| 3,305,304 | 2/1967 | Peterson | 23—107 |

OSCAR R. VERTIZ, *Primary Examiner.*

MILTON WEISSMAN, *Examiner.*

L. A. MARSH, *Assistant Examiner.*

UNITED STATES PATENT OFFICE
CERTIFICATE OF CORRECTION

Patent No. 3,391,990                                              July 9, 1968

Chung Yu Shen

It is hereby certified that error appears in the above numbered patent requiring correction and that the said Letters Patent should read as corrected below.

In the heading to the printed specification, lines 3 and 4, for "assignor to Mitsubishi Petrochemical Company Limited, Tokyo, Japan" read -- assignor to Monsanto Company, St. Louis, Mo., a corporation of Delaware --.

Signed and sealed this 29th day of October 1968.

(SEAL)
Attest:

Edward M. Fletcher, Jr.                                 EDWARD J. BRENNER

Attesting Officer                                            Commissioner of Patents